US012574613B1

(12) United States Patent
Buckner

(10) Patent No.: US 12,574,613 B1
(45) Date of Patent: Mar. 10, 2026

(54) MULTIPLE INTER-PUPILLARY DISTANCE STREAMS

(71) Applicant: Apple Inc., Cupertino, CA (US)

(72) Inventor: Benjamin D. Buckner, Irvine, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/653,207

(22) Filed: May 2, 2024

Related U.S. Application Data

(60) Provisional application No. 63/501,164, filed on May 10, 2023.

(51) Int. Cl.
| | |
|---|---|
| *H04N 21/81* | (2011.01) |
| *G06T 7/593* | (2017.01) |
| *H04N 13/00* | (2018.01) |
| *H04N 13/167* | (2018.01) |
| *H04N 21/84* | (2011.01) |

(52) U.S. Cl.
CPC ......... *H04N 21/8146* (2013.01); *G06T 7/593* (2017.01); *H04N 13/167* (2018.05); *H04N 21/84* (2013.01); *G06T 2207/10021* (2013.01); *G06T 2207/20212* (2013.01); *H04N 2013/0081* (2013.01); *H04N 2013/0096* (2013.01)

(58) Field of Classification Search
CPC .. H04N 21/8146; H04N 13/167; H04N 21/84; H04N 2013/0081; H04N 2013/0096; G06T 7/593; G06T 2207/10021; G06T 2207/20212
See application file for complete search history.

(56) References Cited

U.S. PATENT DOCUMENTS

| | | | | |
|---|---|---|---|---|
| 2016/0156896 A1* | 6/2016 | Heo | ...................... | H04N 13/327 |
| | | | | 345/156 |
| 2022/0286658 A1* | 9/2022 | Tan | ......................... | G06V 40/18 |
| 2025/0005707 A1* | 1/2025 | Su | ........................... | G06T 7/593 |

FOREIGN PATENT DOCUMENTS

WO      WO-2023169283 A1 *   9/2023   ......... G06T 3/4038

OTHER PUBLICATIONS

English Translation of PCT/CN 2023/079064 of WO2023169283 A1 (Year: 2023).*

* cited by examiner

*Primary Examiner* — Kyu Chae
(74) *Attorney, Agent, or Firm* — Blank Rome LLP

(57) ABSTRACT

Providing multiple versions of a 3D media item includes obtaining a 3D media item associated with a first interpupillary distance, synthesizing a plurality of additional versions of the 3D media item each associated with an additional interpupillary distance, and providing the 3D media item and the plurality of additional versions of the 3D media item to one or more playback devices. For each additional interpupillary distance, the 3D media item is reprojected based on a particular additional interpupillary distance and a predetermined depth.

17 Claims, 6 Drawing Sheets

RECEIVE USER REQUEST TO ACCESS 3D MEDIA ITEM FROM MEDIA
PLATFORM
305

DETERMINE IPD ASSOCIATED WITH USER
310

TRANSMIT REQUEST FOR 3D MEDIA ITEM WITH IPD DATA
315

RECEIVE VERSION OF REQUESTED 3D MEDIA ITEM BASED ON IPD
DATA
320

PRESENT RECEIVED VERSION OF REQUESTED 3D MEDIA ITEM ON
PLAYBACK DEVICE
325

MULTIPLE INTER-PUPILLARY DISTANCE STREAMS

BACKGROUND

With the rise of extended reality technology and 3D media, users are more frequently using head-mounted devices to view 3D media. Media providers may supply the 3D media which has been recorded using a stereoscopic camera having a particular inter-axial distance ("IAD"). That is, the spacing of the cameras capturing the media may be configured in a fixed configuration, having a fixed IAD. The media items may be stored on one or more network devices and distributed to multiple user devices.

One difficulty that arises, is when the IAD does not match a user's interpupillary distance (IPD). Different users have different IPDs based on personal physiology. Accordingly, what is needed is an improved technique for providing 3D media items for multiple IPDs.

DETAILED DESCRIPTION

Figure 1:
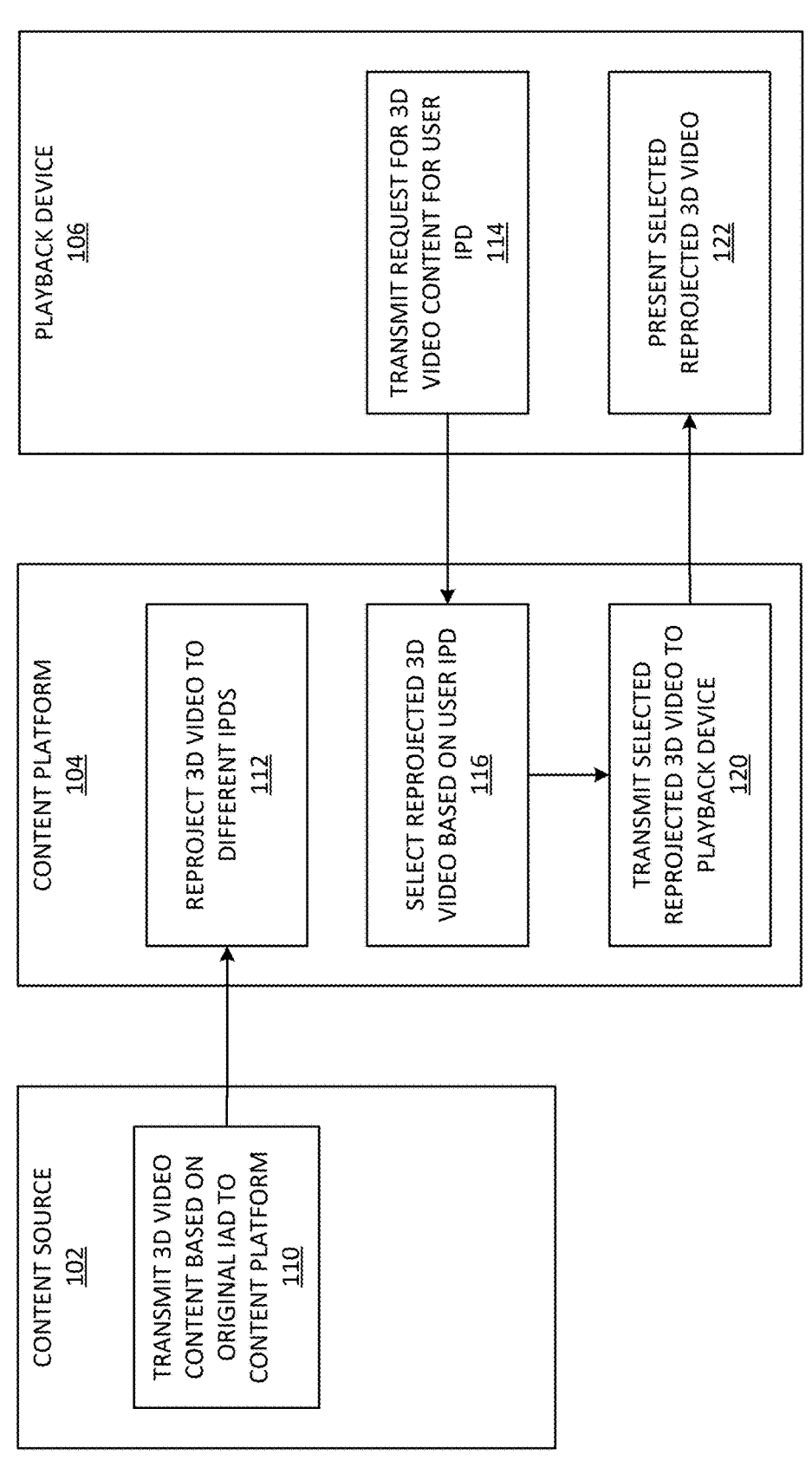
FIG. 1 shows an example flow diagram for providing reprojected 3D media by a content platform, according to some embodiments.

This disclosure relates generally to image processing. More particularly, but not by way of limitation, this disclosure also relates to techniques and systems for providing a 3D media item for multiple IPDs, according to one or more embodiments.

Often, immersive video capture occurs at a fixed IAD, dependent on camera spacing, for example when the immersive video is captured by a stereoscopic camera. However, a user can have a sub-optimal experience viewing the immersive video when 3D media that is recorded using an IAD that does not match a user's IPD. For example, a user with a different IPD than the IAD, by which the immersive video was captured, may have difficulty perceiving scale in the scene. Further, a difference between a user's IPD and the IAD, may cause a vergence conflict where the point at which the eyes are fixated is inconsistent with the depth of an object in the scene. Further, because IPD is not consistent across all users, even if the IAD were adjusted, the problems would still exist.

This disclosure pertains to systems, methods, and computer readable media to generate multiple versions of immersive content to comport to multiple user IPDs. A device may receive a 3D media item captured using a first IAD. The device may then synthesize one or more alternative versions of the 3D media item based on one or more target IPDs. The device may then cause the 3D media item and/or the one or more alternative versions to be made available to client devices for playback. In some embodiments, synthesizing the one or more alternative versions may include reprojecting the images in each frame set to comport to a target IPD. Alternatively, one eye frame from each frame set may be synthesized such that when viewed with the original other eye frame from the frame pair, the frame set comports to a target IPD.

The disclosure also describes a technique for a user subscribing to a particular stream for an immersive media item. For example, a user may subscribe to a stream for a version of the immersive media item synthesized to comport to a particular IPD. The user may request, from a playback device, the immersive media item from a media platform by including the user's IPD, or some indication relate to the user's IPD, in the request such that the media platform can determine a stream for the playback device. Alternatively, the playback device can determine, from among available media streams for the immersive media item, a stream associated with a particular IPD.

According to some embodiments, the frames may be synthesized on a network device. This may be technologically advantageous because a user playback device may have limited processing power, whereas view synthesis may require extensive processing. By offloading view synthesis to a network device that is less resource constrained, a client playback device may still utilize the synthesized view without expending the resources to generate the synthesized view. In addition, generating a synthesized view as described is technically advantageous for IPD synthesis because IPD settings are rarely changed, and the range of relevant values is relatively small.

In the following description, for purposes of explanation, numerous specific details are set forth in order to provide a thorough understanding of the disclosed concepts. As part of this description, some of this disclosure's drawings represent structures and devices in block diagram form, in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, or to resort to the claims being necessary to determine such inventive subject matter. Reference in this disclosure to "one embodiment" or to "an embodiment" means that a particular feature, structure, or characteristic described in connection with the embodiment, is included in at least one embodiment of the disclosed subject matter, and multiple references to "one embodiment" or "an embodiment" should not be understood as necessarily all referring to the same embodiment.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

For purposes of this disclosure, the term "mixed reality environment" refers to a view of an environment that includes virtual content and physical content, such as image data from a pass-through camera or some view of a physical environment.

FIG. 1 shows an example flow diagram for providing reprojected 3D media by a content platform, according to some embodiments. More specifically, FIG. 1 depicts a content platform providing multiple versions of a 3D video based on different target IPDs. For purposes of explanation, the flow diagram depicts data flow between a content source 102, content platform 104, and playback device 106. However, the content source 102 and/or the content platform 104 may include multiple network devices. Further, in some embodiments, the functionality described with respect to content source 102 and content platform 104 may be differently distributed, or may be performed by a single device. Additionally, some of the data and processes may be performed or originate at alternative devices.

The flow diagram 100 begins at block 110, where the content source 102 transmits 3D video content based on original interaxial distance ("IAD") to a content platform 104. According to some embodiments, the content source 102 may be an electronic device which is configured to capture and/or generate immersive media content captured by one or more stereoscopic cameras. The stereoscopic cameras which originally captured the 3D video content are associated with an original IAD, and may be comprised in a system which may include, for example, electronic device associated with an artist or other user which is used to upload the 3D video content to the content platform 104 such that the 3D video content can be accessed by one or more playback devices.

The content platform 104, may include one or more servers or other network devices which are configured to host media items for consumption by playback devices. In some embodiments, the content platform 104 may provide a media library comprised of media content, such as the 3D video content, received from content sources. The content platform 104 may be hosted on a single device, a system of devices, or the like. For example, content platform 104 may be distributed across cloud storage devices.

At block 112, the content platform 104, re-projects the received 3D video content to comport with one or more of IPD's which are different than the IAD by which the 3D video content was recorded. According to some embodiments, the 3D video content may be received as a set of image frame pairs, such as stereoscopic frame pairs comprising the video content. Synthesizing the video content may include, for example, re-projecting each of the image pairs to provide an adjusted view for a particular interpupillary distance. In some embodiments, a single frame for each frame pair may be modified, or both frames of the frame pair may be modified to comport to one or more target interpupillary distances ("IPDs").

According to some embodiments, the content platform 104 may reproject the received 3D video content for a set of predefined IPD's, from which a playback device can subscribe. For example, the content platform 104 may reproject the 3D video content to a wide IPD, such as 70 millimeters ("mm"), a narrow IPD, such as 50 mm, and the medium IPD, such as 64 mm. In some embodiments, the content platform may host each of these synthesized 3D video content items, as well as the original 3D video content.

The flow diagram 100 also shows, at block 114, a playback device 106 transmitting a request for a 3D video content where a user IPD for the playback device. In some embodiments, the request may include an IPD for a user using the playback device, for example from enrollment data or based on device measurement. In some embodiment, the request may include user data indicative of the user IPD, such as a reference to the IPD, an estimated IPD, a relative IPD measurement, or the like. For example, a user playback device 106 may have an IPD of 62 mm. The 3D video content requested may have been recorded using a 75 mm IAD. Returning to the example synthesized 3D video content items described above, the playback device may select the medium IPD synthesized 3D video content, upon determining that the medium IPD synthesized 3D video stream provides a best match for the user of the playback device 106. Alternatively, the playback device 106 may transmit an indication of the user IPD such that the content platform 104 may make a determination as to which of the synthesized 3D video content items (or, alternatively, the original 3D video content) provides the best fit based on the IPD identified by the request.

The flow diagram 100 continues at block 116, where the content platform 104 selects reprojected 3D video based on the user IPD. As described above, the user IPD may be indicated by the request received from playback device 106. Alternatively, the request received from the playback device 106 may indicate a particular synthesized 3D video content item based on the user is IPD. Then, at block 120, the content platform 104 transmits the selected reprojected 3D video to the playback device. The transmission may include sending a copy of the reprojected 3D video for download by the playback device 106. Alternatively, the transmission may include a streaming transmission such that the playback device 106 can play the selected reprojected 3D video in real time or near real time.

The flow diagram 100 concludes at block 122, where the playback device 106 presents the selected reprojected 3D video. In some embodiments, the playback device 106 may be a head mounted device, wearable device, or other electronic device which provides on an immersive experience to a user. As such, the playback device 106 may be configured to present immersive content such as the 3D video on one or more displays to a user. For example, the selected reprojected 3D video may include a set of stereoscopic frame pairs, such that each frame for a given frame pair is presented in front of one of the user's eyes.

Figure 2:
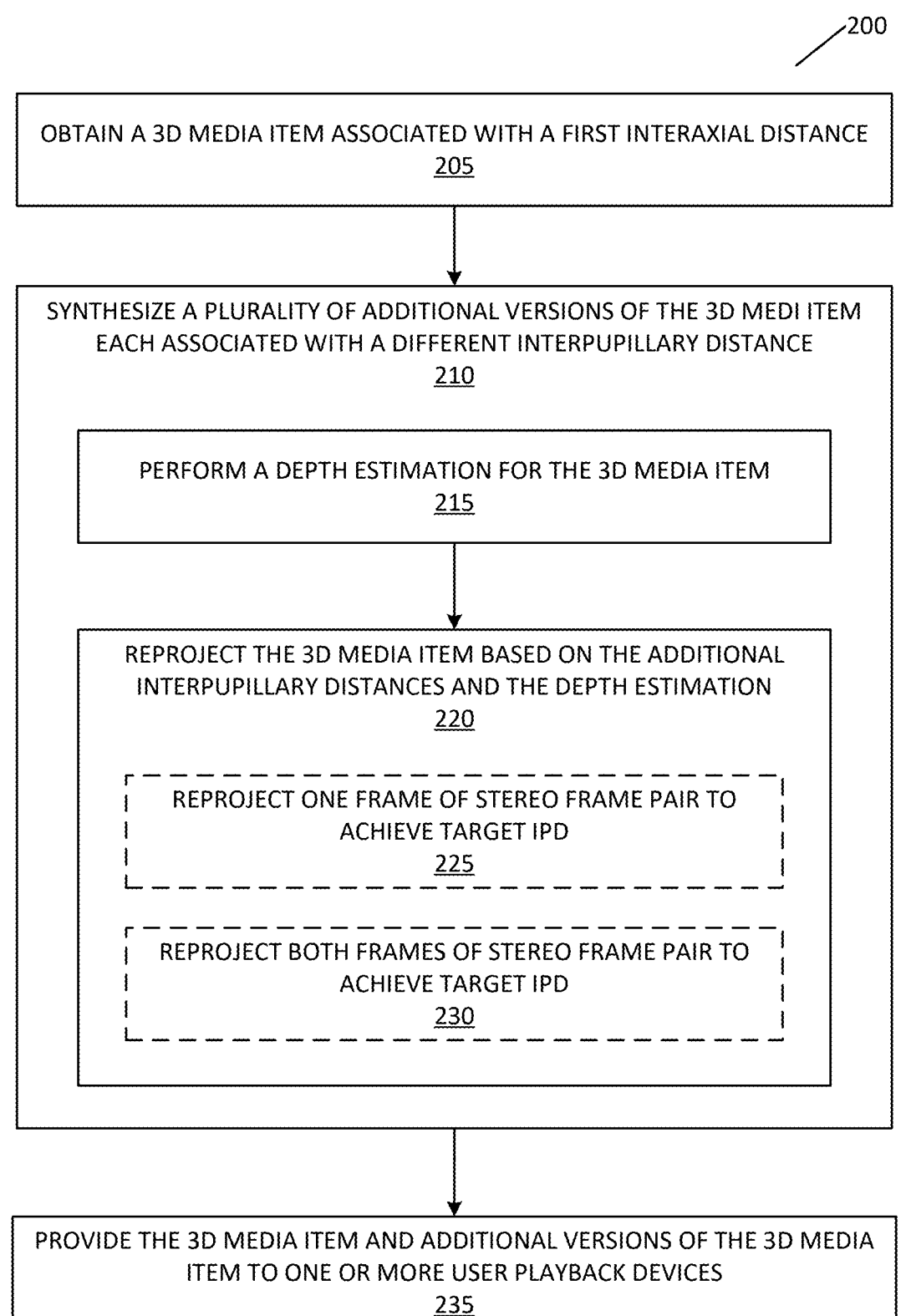
FIG. 2 shows a flowchart of a technique for generating multiple versions of a 3D media item for different IPDs, according to one or more embodiments.

FIG. 2 shows a flowchart of a technique for generating multiple versions of a 3D media item for different IPDs, according to one or more embodiments. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

The flowchart 200 begins at block 205, where a 3D media item is obtained that is associated with a first interaxial distance ("IAD"). According to some embodiments, the 3D media item may be captured by an electronic device which is configured to capture and/or generate immersive media content using one or more stereoscopic cameras. The stereoscopic cameras that originally captured the 3D video content are associated with an original IAD, indicative of a distance between stereoscopic camera lenses.

The flowchart 200 proceeds to block 210, where a plurality of additional versions of the 3D media items are synthesized. Each of the additional versions of the 3D media item are associated with a different interpupillary distance. That is, each of the additional versions may be associated with a different target interpupillary distance, thereby providing a set of variations of the 3D media item available to one or more playback devices. The different interpupillary distances may be predefined interpupillary distances, or may be selected, for example, based on user feedback, characteristics of the 3D media item, or the like.

In some embodiments, synthesizing a plurality of additional versions of the 3D media item includes, at block 215, performing a depth estimation for the 3D media item. In some embodiments, the depth estimation may be determined based on the depth of objects in the 3D media item. Depth estimation may be performed, for example, using stereo depth estimation, image-based depth estimation, or the like. For example, depth estimation may be based on disparity within the stereo image. In some embodiments, the depth estimation may be enhanced by fusion with other types of sensor data captured concurrently with the 3D media item. For example, LIDAR techniques, RF techniques, and the like may be used to obtain depth information which can be fused with the depth estimates to obtain an enhanced depth estimate. For example, a depth sensor may capture depth in the scene, which can be combined with visual image data to determine depth of the 3D media item.

The flowchart proceeds to block 220, where the 3D media item is reprojected based on the additional interpupillary distances and the depth estimation. The 3D media item may be reprojected in a number of ways. One example, as shown at block 225, includes reprojected in one frame of the stereo frame pair to achieve the target IPD across the original frame and reprojected frame. In this example, memory resources may be conserved because one frame of each stereo frame pair across different additional versions of the 3D media item remain the same, and only the other frame of each stereo frame pair is modified across the different additional versions. In the second example, as shown at block 230, both frames of the stereo frame pair of the 3D media item are reprojected to achieve a target IPD. In this example, because both frames are reprojected, an original perspective of the 3D media item may be preserved across the additional versions of the 3D media item, whereas in the first example, a perspective may differ across versions.

Figure 4:
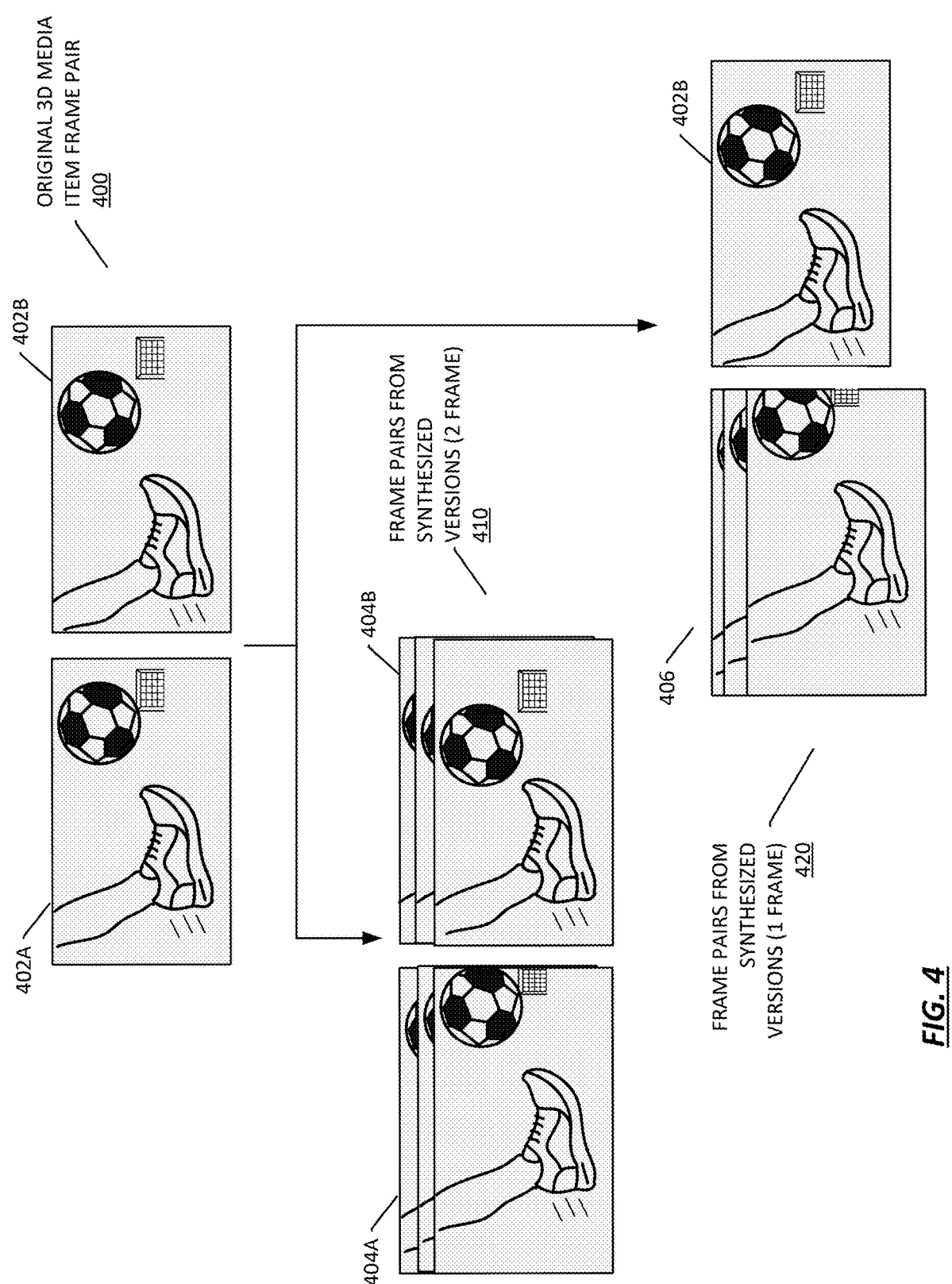
FIG. 4 shows a flow diagram of techniques for reprojecting 3D media items for multiple IPDs, in accordance with some embodiments.

FIG. 4 depicts examples of the two techniques described at blocks 225 and 230. In particular, FIG. 4 shows an example frame pair from an original 3D media item 400. The frame pair includes a left eye frame 402A and a right eye frame 402B. For example, the original 3D media item frame pair 400 may be part of an immersive video made up of a series of frame pairs, where frames 402A and 402B make up one set of stereoscopic frames captured at a particular time. The original 3D media item frame pair 400 may be captured by a stereoscopic camera having an original IAD, and may be provided to a content platform to be made available to multiple users at multiple playback devices.

As described above, in a first example, a set of alternative versions of the 3D media item may be generated by determining a depth in the scene, and reprojecting the original 3D media item for different IPDs accordingly. As such, frame pairs 410 show a set of alternative synthesized versions of the original 3D media item frame pair 400. Each of these synthesized versions of frame pairs 410 may be associated with a different target IPD. In the example described at block 230, both the left eye frame and right eye frame are modified to generate reprojected frame pairs. Thus, each frame pairs from the synthesized first version includes a first eye frame 404A and second eye frame 404B.

By contrast, in a second example, a set of alternative versions of the 3D media item may be generated by determining a depth in the scene, and reprojecting the original 3D media item for different IPDs accordingly by reprojecting one frame of each frame pair. As such, frame pairs 420 show a set of alternative synthesized versions of the original 3D media item frame pair 400. Each of these synthesized versions of frame pairs 410 may be associated with a different target IPD. In the example described at block 230, the left eye frame 406 is modified to generate reprojected frame pairs when combined with the original right eye frame 402B.

According to some embodiments, modifying both frames of a stereoscopic frame pair to generate a set of reprojected frames may preserve a perspective view from the original 3D media item frame pair. However, storage requirements are increased to maintain the alternative versions of the 3D media item. By contrast, storage requirements are reduced by modifying only a single frame of each frame pair, as shown by frame pairs 420. However, the perspective is slightly different. As such, the particular technique used may be automatically selected by a device or user-selected based on system resources or priorities.

Returning to FIG. 2. The flowchart 200 concludes at block 235, where the 3D media item and the additional versions of the 3D media items are provided to one or more user playback devices. In some embodiments, the 3D media item and the additional versions of the 3D media item may be provided, for example, by a media platform hosting a media library, media apps such as streaming apps, network storage, or the like.

Figure 3:
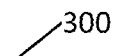
FIG. 3 shows a flowchart of a technique for requesting a 3D media item for a particular IPD, according to one or more embodiments.
Figure 3:
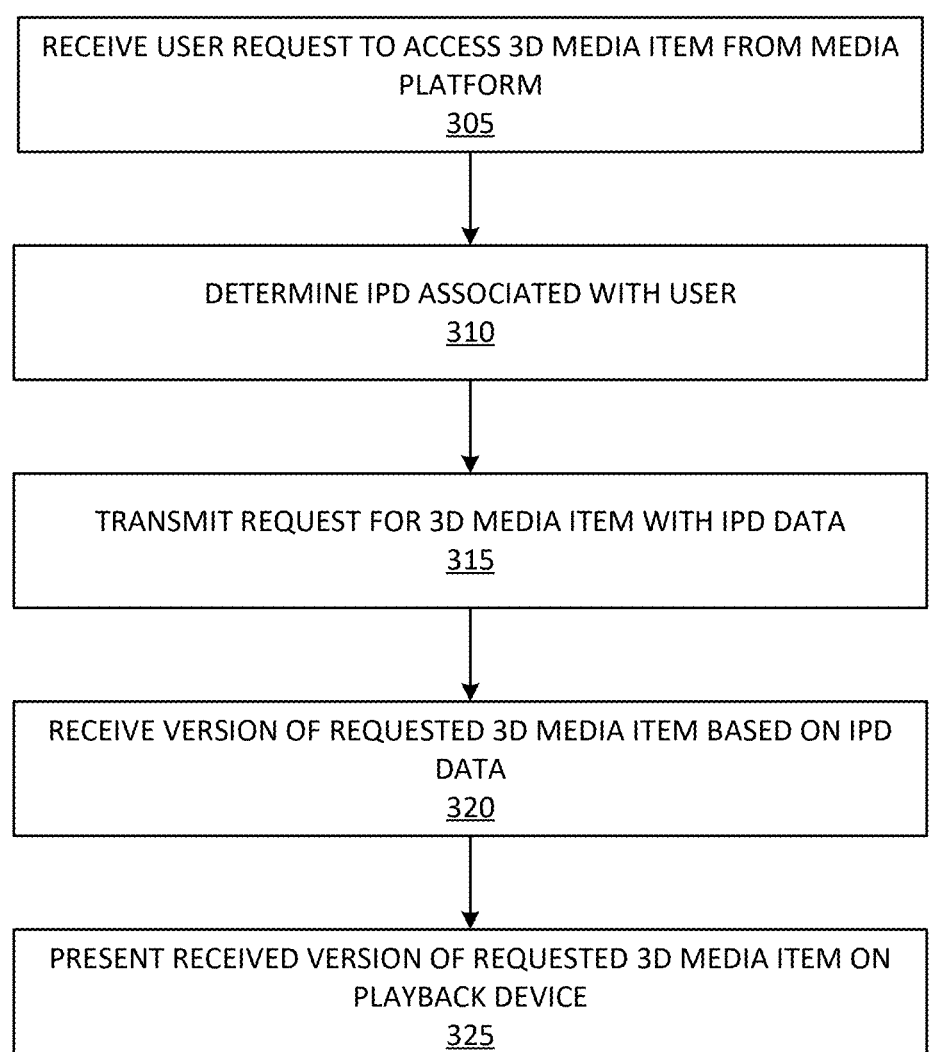

FIG. 3 shows a flowchart of a technique for requesting a 3D media item for a particular IPD, according to one or more embodiments. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

The flowchart 300 begins at block 305, where the user request is received to access the 3D media items from a media platform. The request may be received, for example, via user input into a user interface for a particular media item. For example, an application may be running on a user's device which provides a view of available media items for selection. In some embodiments, the request may be received at a playback device, such as a head mounted device, mobile device, or other electronic device which provides functionality for presenting immersive video content. Further, the request may be made at a client device which is a separate device from the playback device, such as a base station, desktop computer, mobile device, accessory device, or the like.

The flowchart 300 continues at block 310, where the IPD associated with the user is determined. In some embodiments, the IPD may be predetermined, for example based on enrollment data for the user at the playback device. In some embodiments, the IPD may be measured with the request is made, for example using eye tracking data, sensor data, image data, or the like from the playback device. In some embodiments, the IPD may be predefined by the playback device, or may be based on modification to the configuration of the moment device which causes media to be presented to a user with a particular IPD.

The flowchart 300 continues to block 315, where the playback device (for other client device) transmits the request for the 3D item with the IPD data. In some embodiments, the IPD for the user may be included in or otherwise indicated by the request. For example, the request may include the particular user's IPD, or some indication of an IPD preference for the user or device. For example, the request may be for a medium-size IPD without providing a specific IPD measurement for the user. As another example, a user may select a media stream for the item for a particular IPD. For example, the user interface may indicate available alternative versions of the 3D media item which are projected for different IPDs. The request may be transmitted to a platform which may include, for example, a media source such as a network storage device, cloud storage, remote device, or the like. In some embodiments, the platform may include is a system that captured the 3D media item using a stereoscopic camera, or may be a separate system configured to host an immersive media items.

In response to request, at block 320, the requested version of the items received based on the IPD data. According to some embodiments, the playback device may receive the requested version of the 3D item directly from the platform, or the version requested media item may be received at an additional client device communicatively connected to the playback device, such as a base station, the mobile device, desktop computer, or other electronic device.

The flowchart 300 concludes at block 325, where the received version of requested review media item is presented on the playback device. As described above, the playback device may be a head mounted device, such as a headset, which is configured to present immersive media items. The received version of the 3D media item may be reprojected for a different IPD than the original the item was captured. Thus, the received version will be presented to the user such that the depth of the scene and the scale of the object in the scene are more consistent with intended depth and scale than if the original 3D media item was presented.

Figure 5:
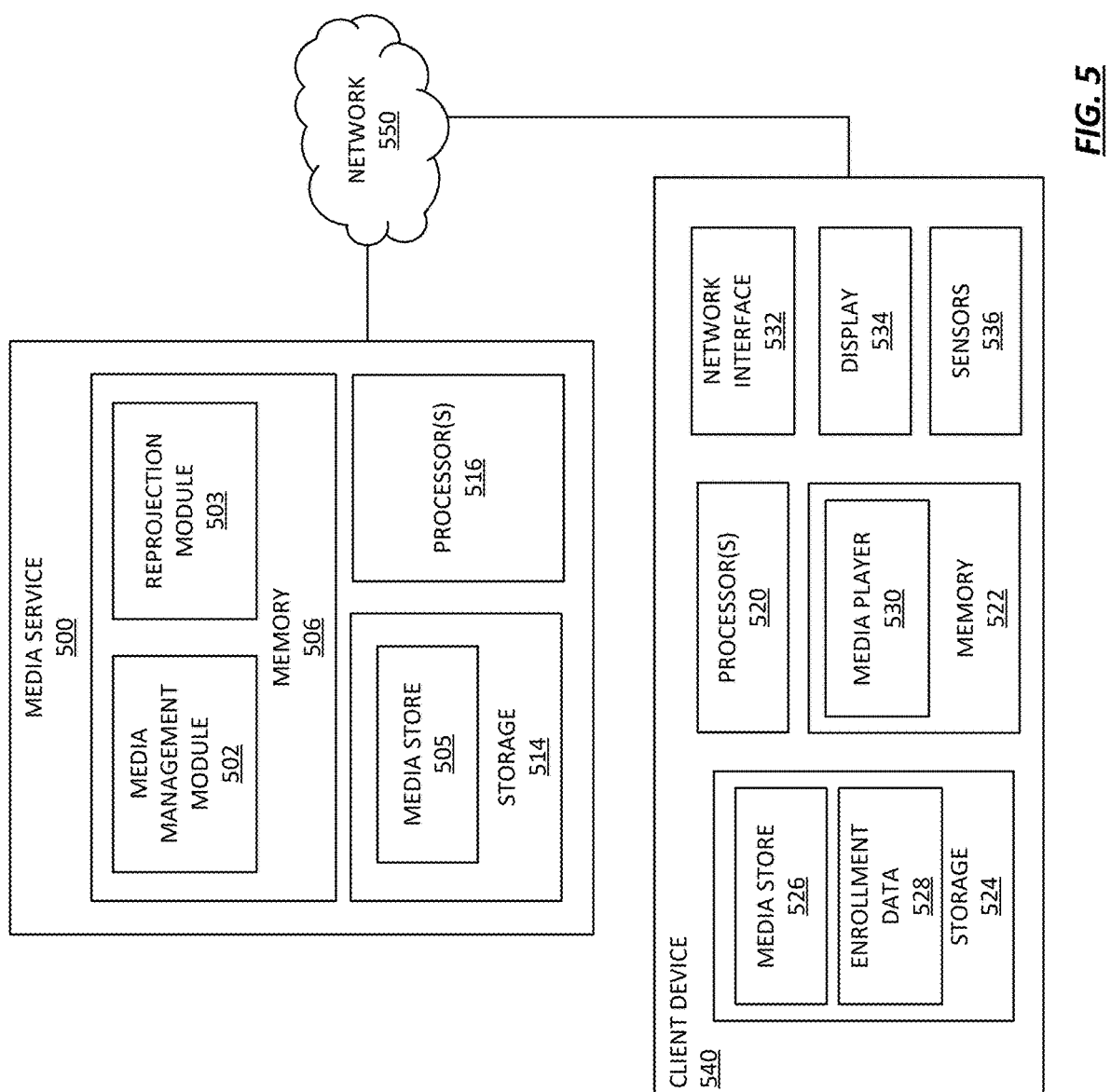
FIG. 5 shows, in block diagram form, a simplified system diagram according to one or more embodiments.

Referring to FIG. 5, a simplified block diagram of a client device 540 which may be utilized to receive and display immersive media content from a media service 500. The system diagram includes client device 540 which may include various components. Client device 540 may be part of the multifunctional device, such as phone, tablet computer, personal digital assistant, portable music/video player, wearable device, head mounted device, base station, laptop computer, desktop computer, network device, or any other electronic device, which has the ability to capture image data. Further, the various components and functionality of client device 540 may be distributed across multiple devices.

Client device 540 may include one or more processors 520, such as a central processing unit (CPU). Processors 520 may include a system-on-chip, such as those found in mobile devices and include one or more dedicated graphics processing units (GPUs) or other graphics hardware. Further, processor(s) 520 may include multiple processors of the same or different type. Client device 540 may also include a memory 522. Memory 522 may include one or more different types of memory, which may be used for performing device functions in conjunction with processors 520. Memory 522 may store various programming modules for execution by processor(s) 520, including media player 530, which may be configured to provide a user interface for a user to request immersive media from media service 500, and to facilitate playback of immersive 3D media items. Client device 540 may also include storage 524. Storage 524 may include data utilized by the media player 530. For example, storage 524 may be configured to store enrollment data 528, such as a user's IPD. Storage 524 may also include a media store 526, which may comprise media content to be presented by the client device 540.

In some embodiments, the client device 540 may include other components utilized for presenting immersive 3D media items, such as one or more sensors 536, such as cameras, depth sensors, and the like. In one or more embodiments, each of the one or more cameras may be a traditional RGB camera, a depth camera, or the like. Further, cameras may include a stereo or other multi camera system, a time-of-flight camera system, or the like which capture images from which depth information of the scene may be determined. Sensors 536 may be incorporated into client device 540 capturing different perspectives. For example, sensors 536 may include one or more scene cameras and one or more user-facing cameras, such as eye tracking cameras or body tracking cameras.

The client device 540 may also include a display 534, which may include an opaque, transparent, or translucent display. In some embodiments, the display 534 may be incorporated in a head mounted device and configured to present 3D media items such that the display 534 presents a left eye image and a right eye image to a user. The client device 540 also includes a network interface 532, which allows the client device 540 to communicate with a media service 500 over a network 550. Network 550 may include a local area network, wide area network, and the like, which provide data communication between the client device 540 and the media service 500. As such, network 550 may include the Internet.

Media service 500 may include one or more servers or other network devices configured to host immersive media content. As such the functionality and components of media service 500 may be comprised of multiple devices in the form of an electronic system. Accordingly, although certain calls and transmissions are described herein with respect to the particular systems as depicted. In one or more embodiments, the various calls and transmissions may be differently directed based on the differently distributed functionality. Further, additional components may be used, or some combination of the functionality of any of the components may be combined.

Media service may include one or more processors 516, such as a central processing unit (CPU). Processors 516 may include a system-on-chip such as those found in mobile devices and include one or more dedicated graphics processing units (GPUs) or other graphics hardware. Further, processor(s) 516 may include multiple processors of the same or different type. Media service 500 may also include a memory 506. Memory 506 may include one or more different types of memory, which may be used for performing device functions in conjunction with processor(s) 516.

Memory 506 may store various programming modules for execution by processor(s) 516, including media management module 502, which may be configured to manage storage of immersive media items, and requests for media items, from one or more playback devices, such as client device 540. Memory 506 may also include a reprojection module 503, which may be configured to generate multiple versions of a 3D media item by reprojecting the 3D media item to different target IPDs. Media service 500 may also include storage 514. Storage 514 may include one or more media stores 505 for hosting the immersive 3D media items, and the reprojected alternative versions of the 3D media items.

There are many different types of electronic systems that enable a person to experience immersive 3D media items. Examples include: head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium, through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 6:
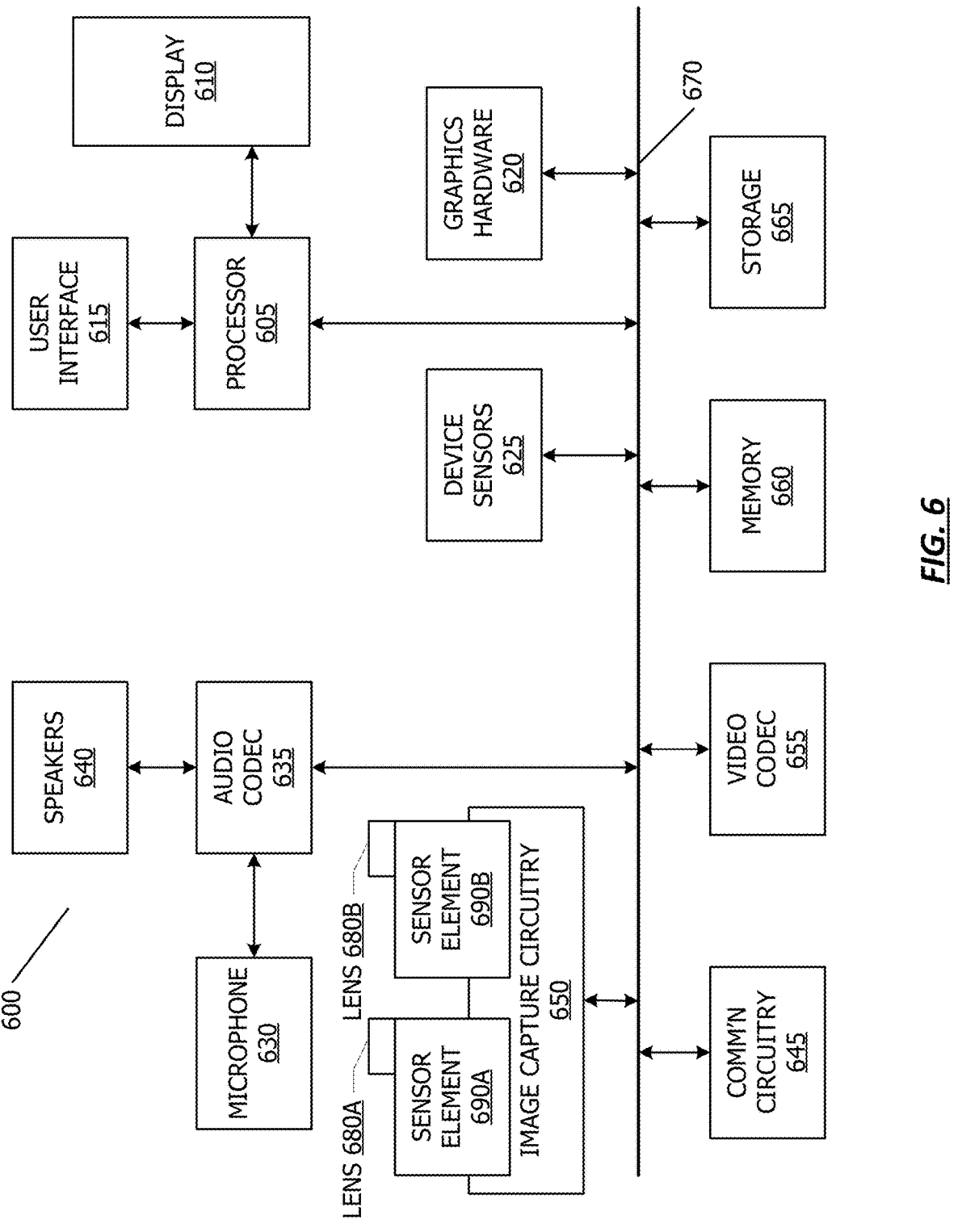
FIG. 6 shows, in block diagram form, a computer system in accordance with one or more embodiments.

Referring now to FIG. 6, a simplified functional block diagram of illustrative multifunction electronic device 600, is shown according to one embodiment. Each of electronic devices may be a multifunctional electronic device or may have some or all of the described components of a multifunctional electronic device described herein. Multifunction electronic device 600 may include some combination of processor 605, display 610, user interface 615, graphics hardware 620, device sensors 625 (e.g., proximity sensor/ambient light sensor, accelerometer and/or gyroscope), microphone 630, audio codec 635, speaker(s) 640, communications circuitry 645, digital image capture circuitry 650 (e.g., including camera system), memory 660, storage device 665, and communications bus 670. Multifunction electronic device 600 may be, for example, a mobile telephone, personal music player, wearable device, tablet computer, and the like.

Processor 605 may execute instructions necessary to carry out or control the operation of many functions performed by device 600. Processor 605 may, for instance, drive display

610 and receive user input from user interface 615. User interface 615 may allow a user to interact with device 600. For example, user interface 615 can take a variety of forms, such as a button, keypad, dial, a click wheel, keyboard, display screen, touch screen, and the like. Processor 605 may also, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include one or more lens assemblies, such as 680A and 680B. The lens assemblies may have a combination of various characteristics, such as differing focal length and the like. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still images, video images, enhanced images, and the like. Output from image capture circuitry 650 may be processed, at least in part, by video codec(s) 655 and/or processor 605 and/or graphics hardware 620, and/or a dedicated image processing unit or pipeline incorporated within circuitry 645. Images so captured may be stored in memory 660 and/or storage 665.

Memory 660 may include, one or more different types of media used by processor 605, and graphics hardware 620 to perform device functions. For example, memory 660 may include memory cache, read-only memory (ROM), and/or random-access memory (RAM). Storage 665 may store media (e.g., audio, image, and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or computer readable code, organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art, to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1-4, or the arrangement of elements shown in FIGS. 5-6, should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   obtain a 3D media item associated with a first interpupillary distance;
   synthesize a plurality of additional versions of the 3D media item each associated with an additional interpupillary distance;
   receive a request for the 3D media item from a playback device, wherein the request comprises user data corresponding to a user interpupillary distance;
   select a particular version of the 3D media item from among the 3D media item and the plurality of the additional versions of the 3D media item based on the user data; and
   provide the particular version of the 3D media item to the playback device.

2. The non-transitory computer readable medium of claim 1, wherein the computer readable code to synthesize the plurality of additional versions of the 3D media item comprises computer readable code to:
   for each additional interpupillary distance, reproject the 3D media item based on a particular additional interpupillary distance and a predetermined depth.

3. The non-transitory computer readable medium of claim 1, wherein the computer readable code to synthesize the plurality of additional versions of the 3D media item comprises computer readable code to:
   perform depth estimation for the 3D media item; and
   for each additional interpupillary distance, reproject the 3D media item based on a particular additional interpupillary distance and the depth estimation.

4. The non-transitory computer readable medium of claim 1, wherein the 3D media item comprises a series of stereoscopic frame pairs.

5. The non-transitory computer readable medium of claim 4, wherein the computer readable code to synthesize the plurality of additional versions of the 3D media item comprises computer readable code to:
   synthesize a first frame and a second frame for each stereoscopic frame pair of the 3D media item.

6. The non-transitory computer readable medium of claim 4, wherein the computer readable code to synthesize the plurality of additional versions of the 3D media item comprises computer readable code to:
   synthesize a first frame for each stereoscopic frame pair of the 3D media item, wherein the first frame for each stereoscopic frame pair is paired with a second frame from the obtained 3D media item to form a stereoscopic frame pair that supports a given interpupillary distance.

7. A system comprising:
   one or more processors; and
   one or more computer readable media comprising computer readable code executable by the one or more processors to:
      obtain a 3D media item associated with a first interpupillary distance;
      synthesize a plurality of additional versions of the 3D media item each associated with an additional interpupillary distance;
      receive a request for the 3D media item from a playback device, wherein the request comprises user data corresponding to a user interpupillary distance;

select a particular version of the 3D media item from among the 3D media item and the plurality of the additional versions of the 3D media item based on the user data; and
      provide the particular version of the 3D media item to the playback device.

8. The system of claim 7, wherein the computer readable code to synthesize the plurality of additional versions of the 3D media item comprises computer readable code to:
   for each additional interpupillary distance, reproject the 3D media item based on a particular additional interpupillary distance and a predetermined depth.

9. The system of claim 7, wherein the computer readable code to synthesize the plurality of additional versions of the 3D media item comprises computer readable code to:
   perform depth estimation for the 3D media item; and
   for each additional interpupillary distance, reproject the 3D media item based on a particular additional interpupillary distance and the depth estimation.

10. The system of claim 7, wherein the 3D media item comprises a series of stereoscopic frame pairs.

11. The system of claim 10, wherein the computer readable code to synthesize the plurality of additional versions of the 3D media item comprises computer readable code to:
   synthesize a first frame and a second frame for each stereoscopic frame pair of the 3D media item.

12. The system of claim 10, wherein the computer readable code to synthesize the plurality of additional versions of the 3D media item comprises computer readable code to:
   synthesize a first frame for each stereoscopic frame pair of the 3D media item, wherein the first frame for each stereoscopic frame pair is paired with a second frame from the obtained 3D media item to form a stereoscopic frame pair that supports a given interpupillary distance.

13. A method comprising:
   obtaining a 3D media item associated with a first interpupillary distance;
   synthesizing a plurality of additional versions of the 3D media item each associated with an additional interpupillary distance;
   receiving a request for the 3D media item from a playback device, wherein the request comprises user data corresponding to a user interpupillary distance;
   selecting a particular version of the 3D media item from among the 3D media item and the plurality of the additional versions of the 3D media item based on the user data; and
   providing the particular version of the 3D media item to the playback device.

14. The method of claim 13, wherein synthesizing the plurality of additional versions of the 3D media item comprises:
   for each additional interpupillary distance, reprojecting the 3D media item based on a particular additional interpupillary distance and a predetermined depth.

15. The method of claim 13, wherein synthesizing the plurality of additional versions of the 3D media item comprises:
   performing depth estimation for the 3D media item; and
   for each additional interpupillary distance, reprojecting the 3D media item based on a particular additional interpupillary distance and the depth estimation.

16. The method of claim 13, wherein the 3D media item comprises a series of stereoscopic frame pairs.

17. The method of claim 16, wherein synthesizing the plurality of additional versions of the 3D media item comprises:

synthesizing a first frame and a second frame for each stereoscopic frame pair of the 3D media item.

* * * * *